May 31, 1938.                H. H. MONTGOMERY ET AL                2,118,980
                                DENTAL IMPRESSION TRAY
                                  Filed April 13, 1936
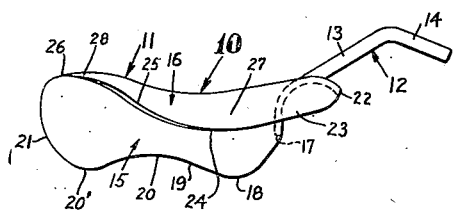
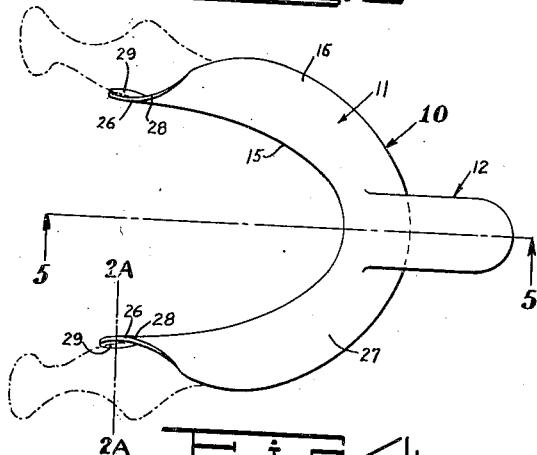
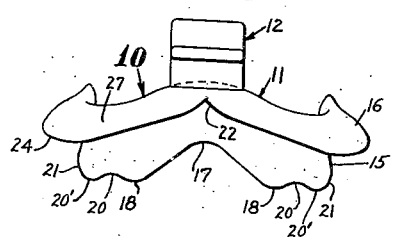
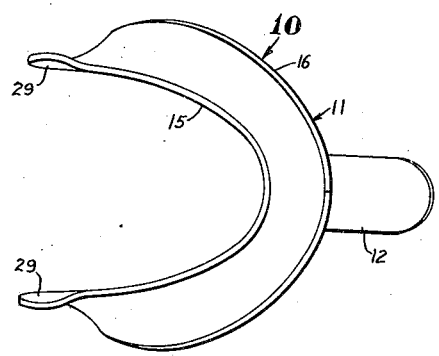
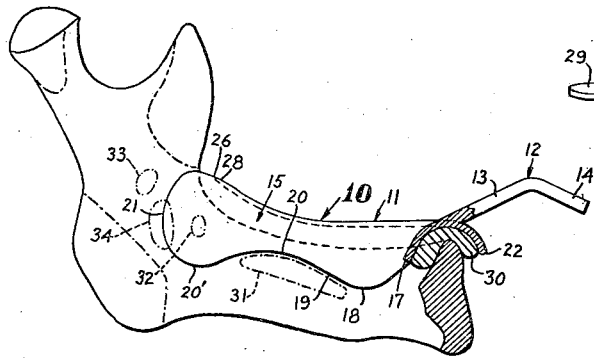
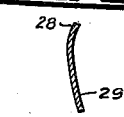
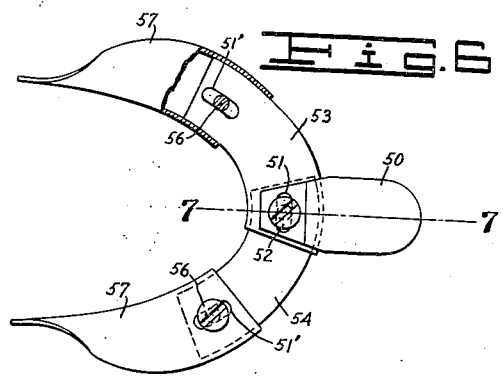
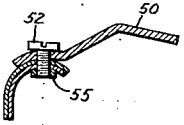
INVENTORS.
H. H. MONTGOMERY.
A. J. BOURGEOIS.
BY
ATTORNEY.

Patented May 31, 1938

2,118,980

UNITED STATES PATENT OFFICE 2,118,980

DENTAL IMPRESSION TRAY

Howard H. Montgomery and Alphonse J. Bourgeois, Los Angeles, Calif.

Application April 13, 1936, Serial No. 74,086

4 Claims. (Cl. 32—17)

This invention relates to dental impression trays.

The general object of the invention is to provide an improved tray for use in making lower dentures.

A more specific object of the invention is to provide a tray, the use of which will enable the operator to secure a denture which is firmly held in place with complete comfort to the wearer.

Another object of the invention is to provide an impression tray including inner and outer rims wherein the inner rim is of novel configuration so that it will function properly in the mouth.

Another object of the invention is to provide an impression tray having inner and outer rims of novel configuration.

Another object of the invention is to provide a novel, adjustable impression tray.

Other objects and the advantages of our invention will be apparent from the following description taken in connection with the accompanying drawing, wherein:

Fig. 1 is a side elevation of a tray showing our invention;

Fig. 2 is a top plan view of the tray;

Fig. 2A is a section taken on line 2A—2A of Fig. 2;

Fig. 3 is a view of the tray looking towards the handle;

Fig. 4 is a bottom plan view of the tray;

Fig. 5 is a section taken on line 5—5 of Fig. 2 showing the manner in which the tray engages the mandible;

Fig. 6 is a top plan view, with parts broken away, of a modified form of tray; and Fig. 7 is a section taken on line 7—7 of Fig. 6.

Referring to the drawing by reference characters we have shown our invention as embodied in a lower denture impression tray which is indicated generally at 10. As shown this tray comprises a body 11 having a handle 12 which may be integral with the body. The handle includes an upwardly directed portion 13 and a gripping portion 14 shown as arranged at an angle to the portion 13.

The body 11 is generally U-shaped in cross section and comprises an inner rim 15 and an outer rim 16. The inner rim includes a narrow portion 17 below the handle and from this portion 17 the rim increases in depth abruptly to location 18 at each side. The inner rim thence is gradually curved upwardly as at 19 to a shallow point 20 which is slightly in advance of the medial portion of the rim, thence the inner rim increases in depth slightly to location 20' after which the rim is rounded rearwardly and upwardly as at 21.

The outer rim advances forwardly from beneath the handle as at 22 with practically no varying in depth of the wall 23 to a location 24 about midway of the length of the outer rim from which location the rim gradually decreases in depth as at 25 until it vanishes at 26. The rim at 22 is rounded as shown and this roundness continues at 27 until near the point 25 where the rim approaches a horizontal position gradually until at the portion 28 the rim is practically horizontal.

In its extreme end the rounded portion 21 has its lower point 29 flared outwardly as shown in Figs. 2 and 2A.

In use the tray is designed so that after the plastic material 30 in Fig. 5 is disposed in place the tray will fit from a point just above the genio-glossus muscle and will then advance abruptly to the location 18 which is disposed at the lower point of the tray and at the anterior portion of the mylo-hyoid ridge which is indicated at 31 in Fig. 5. This location is opposite the second bi-cuspid tooth and from this location the inner rim extends up along the mylo-hyoid ridge and dips into the space just beyond the superior constrictor muscle which is indicated at 32 in the drawing and which is anterior to the mandibular foramen indicated at 33 in Fig. 5 so that the portion 29 of the tray engages within the area of the pre-tonsilar fossae indicated at 34 in Fig. 5, thence the rim extends over the triangular notch indicated at 35 in Fig. 5.

The construction is such that the denture engages in such a manner that great stability is secured while at the same time ease of manufacture is assured.

In Figs. 6 and 7 we show a slight modification of our invention wherein the tray includes a handle 50 which has a slot 51 therein through which a bolt 52 passes. This bolt engages similar slots in telescopically arranged tray segments 53 and 54. The bolt 52 is provided with a nut 55 and the construction is such that the segments 53 and 54 may be adjusted, also the handle may be adjusted after which the nut 55 may be tightened to hold the parts assembled.

The segments 53 and 54 are shown as provided with slots 51' through which bolts 56 pass. The segments 53 and 54 are engaged by end telescoping segments 57 which are provided with slots in line with the slots 51' so that when the bolts 56 are released the segments will be fastened after which the bolts will be tightened.

In Figs. 6 and 7 the shape of the inner and outer rims of the tray is identical with the tray shown in Figs. 1 to 5 and a detailed description of the configuration of this tray is believed to be unnecessary.

From the foregoing description it will be apparent that we have provided a novel dental impression tray which is simple in construction and highly efficient in use.

Having thus described our invention we claim:

1. A dental impression tray, comprising a body having an outer and an inner rim and being generally U-shaped in cross section, said inner rim being of greatest depth at a location immediately behind the front and some distance in advance of the rear thereof, with the intermediate portion of decreasing depth at each side and with the extreme rear end rounded.

2. A dental impression tray, comprising a body having a handle thereon, said body being made of metal and comprising an outer and an inner rim and being generally U-shaped in cross section, said inner rim adjacent the handle being short thence increasing abruptly in depth to a location spaced from the handle, thence decreasing gradually in depth to a location intermediate each of the sides, thence increasing in depth gradually and terminating in a rounded portion.

3. A dental impression tray, comprising a body having a handle thereon at the center, said body being made of metal and comprising an outer and an inner rim and being generally U-shaped in cross section, said inner rim being of greatest depth at a location immediately behind the front and some distance in advance of the rear thereof, with the intermediate portion at each side of decreasing depth to a medial point and with the extreme rear end rounded, said outer rim at each side gradually curving to a flat position rearwardly and decreasing in width towards the rear.

4. A dental impression tray, comprising a body having a handle thereon at the center, said body being made of metal and comprising an outer and an inner rim and being generally U-shaped in cross section, said inner rim adjacent the handle being short thence increasing abruptly in depth at each side to a location spaced from the handle, thence decreasing gradually in depth to a location intermediate of the sides, thence increasing in depth gradually and terminating in a rounded portion, said outer rim being of uniform width at each side throughout the major portion of its length and decreasing in width abruptly at the end.

HOWARD H. MONTGOMERY.
ALPHONSE J. BOURGEOIS.